United States Patent [19]
Collins et al.

[11] Patent Number: 5,384,708
[45] Date of Patent: Jan. 24, 1995

[54] MAIL PROCESSING SYSTEM HAVING A METER ACTIVITY LOG

[75] Inventors: Jacqueline Collins, Bridgeport; Terrence M. Doeberl, West Redding; Linda V. Gravell, Guilford; Kevin D. Hunter, Stratford, all of Conn.

[73] Assignee: Pitney Bowes Inc., Stamford, Conn.

[21] Appl. No.: 967,305

[22] Filed: Oct. 26, 1992

[51] Int. Cl.6 .............................................. G07B 17/00
[52] U.S. Cl. ................... 364/464.02; 364/406
[58] Field of Search .................... 364/406, 464.02

[56] References Cited

U.S. PATENT DOCUMENTS

| | | | |
|---|---|---|---|
| 3,040,984 | 6/1962 | Cox et al. | 364/406 X |
| 3,978,457 | 8/1976 | Check, Jr. et al. | 364/464.02 |
| 4,731,749 | 3/1988 | Kirschner et al. | 364/464.02 |
| 4,752,950 | 5/1988 | Le Carpentier | 364/464.02 X |
| 4,757,532 | 7/1988 | Gilham | 380/23 |
| 4,775,246 | 10/1988 | Edelmann et al. | 380/23 |
| 4,796,196 | 1/1989 | Durst, Jr. et al. | 364/478 |
| 4,800,504 | 1/1989 | Durst, Jr. et al. | 364/478 |
| 4,852,013 | 7/1989 | Durst, Jr. et al. | 364/478 |
| 4,907,271 | 3/1990 | Gilham | 380/25 |
| 4,931,943 | 6/1990 | Vermesse | 364/464.02 |
| 4,935,078 | 6/1990 | Bergman et al. | 156/64 |
| 5,075,852 | 12/1991 | Salazar et al. | 364/464.02 |

Primary Examiner—Edward R. Cosimano
Attorney, Agent, or Firm—Charles G. Parks, Jr.; Melvin J. Scolnick

[57] ABSTRACT

The method and apparatus for providing a meter activity log is usable in a mail processing machine which is adapted to receive a plurality of postage meters. The mail processing machine includes a microcomputer control and nonvolatile memory storage means for storing meter accounting information. The meter accounting information is stored in association with a unique identification of each of a plurality of meters installed in the mail processing machine. Accounting information relating to the uniquely-identified meter activity which has occurred off-line is determined and stored. Information relative to the uniquely-identified meter activity upon the occurrence of each of a plurality of selected events which occur on-line is also stored. The log may be printed and the information cleared by command of the operator.

13 Claims, 5 Drawing Sheets

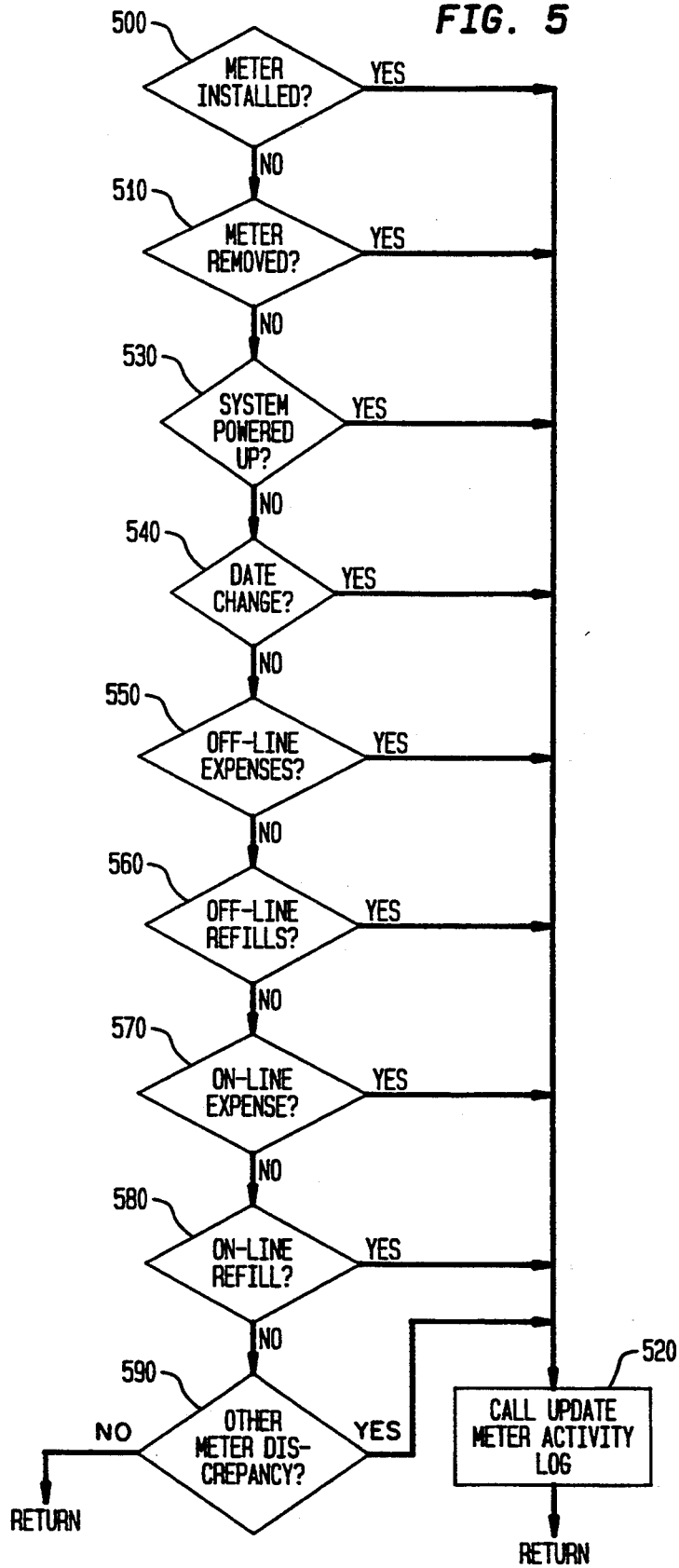

5,384,708

MAIL PROCESSING SYSTEM HAVING A METER ACTIVITY LOG

FIELD OF THE INVENTION

The invention relates to mail processing systems which include postage meters and more particularly to mail processing systems having a removable cartridge meter adapted for installation in a plurality of such systems.

BACKGROUND OF THE INVENTION

Electronic postage meters are well known. Such devices operate under microcomputer control to perform printing and accounting operations associated with the printing of a postal indicia on an envelope. Such accounting is based typically on funds which are stored as register values in the memory of the meter and decreased as postage is expended in accordance with the postal value printed by the meter. Other accounting systems are known such as the so-called current account meters in which the register value simply increases in accordance with the expending of postal value and the expended value is calculated on the difference in register reading from one time to the next.

Conventionally, in the United States, and in other countries as well, the Postal authorities who control the meter placements have required that a separate log or journal be maintained on a daily basis so as to provide a double check on the expending of funds as accounted for by the meter and to provide a basis for reconciliation of funds in the event of malfunction of the meter and also to aid in control of any attempts to defraud the Post Office with respect to expenditures actually made.

U.S. Pat. No. 4,931,943 describes a meter which includes apparatus for collecting this accounting information and printing it at least every two months using an accompanying journal printer. While this apparatus may work well with the previously known stand-alone meters where the meter and log may be kept together, in the environment of a plurality of mail processing installations adapted to receive a plurality of meters, the difficulty in reconciling accounts using the meter information alone becomes almost impossible, much less the automation of such providing of a Meter Activity Log. There is no teaching in this patent of a solution to the problem of automatic collection of data necessary for reconciliation of accounts in situations or installations where a plurality of meters can be transported and used in various systems by different operators.

SUMMARY OF THE INVENTION

It is therefore an object of the invention to provide an automatic logging operation to facilitate the keeping of a Meter Activity Log of meter operation at a particular mail-processing system which can accommodate a plurality of meters.

It is a further object of the invention to provide a method and apparatus for preparing the daily meter activity log which is required by the various postal agencies in a mail processing system adapted to receive a plurality of postage meters.

It is yet a further object to reduce the non-volatile memory requirements for storing the historical information required for preparation of the meter activity log.

These and other objects are accomplished by providing in a mail processing machine adapted to receive a plurality of postage meters, logging means for providing a meter activity log, said logging means comprising a microcomputer control and nonvolatile memory storage means for storing meter accounting information, said meter accounting information being storable in association with a unique identification of each of a plurality of meters installed in the mail processing machine, the logging means including means for determining and storing accounting information relating to the uniquely-identified meter activity which has occurred off-line and for storing information relative to the uniquely-identified meter activity upon the occurrence of each of a plurality of selected events which occur on-line.

In another aspect, the invention comprises a method for logging meter activity in a mail processing machine adapted to receive a plurality of postage meters, said method comprising the steps of installing a meter in the mail processing machine, uniquely identifying said installed meter in storing accounting information relating to said meter upon installation thereof, determining and storing accounting information relating to the uniquely-identified meter activity which has occurred off-line and thereafter storing uniquely-identified meter information relative to the meter activity upon the occurrence of each of a plurality of selected events which occur on-line.

BRIEF DESCRIPTION OF THE DRAWING

FIG. 5 is a flow chart of the automated meter-logging operation in accordance with the invention.

DESCRIPTION OF THE PREFERRED EMBODIMENT

Figure 1:
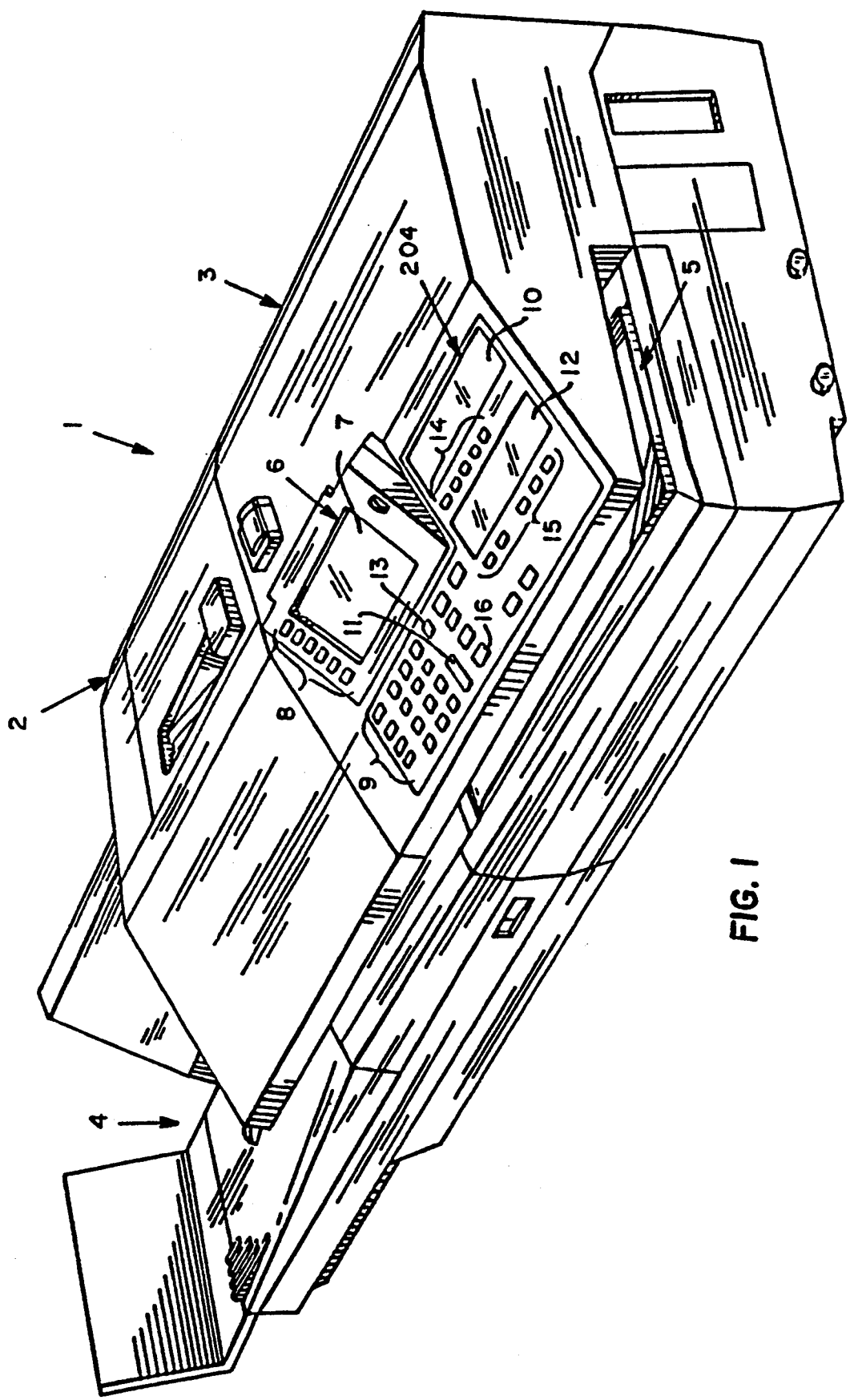
FIG. 1 is a perspective view of a postage meter and a suitable mailing/machine in which the invention may reside.

In FIG. 1, there is shown generally at 1 a mailing machine comprising feeder section 2 and an electronic postage meter section at 3. Envelopes are placed on the hopper 4 where they are serially fed to the meter section 3 for imprint of a meter indicia by a printing mechanism not visible in this Figure. In the preferred embodiment, mailing machine includes scale 5 for weighing the envelope and communicating the weight to a microprocessor control so that the proper postage value may be imprinted on the envelope. In the preferred embodiment illustrated here, the meter section 3 comprises a detachable meter which may be easily removed and replaced by a similar meter.

The mailing machine 1 has a user interface indicated at 6. This illustrated user interface includes visual display 7 and a plurality of soft keys 8 aligned with respective portions of the display screen as well as the hard keys indicated at 9 of a keyboard or keypad. Typically, as shown there will be "enter" key 11 and "return" key 13. A "start" key is shown at 16. The interface may also include further displays such as those shown at 10 and 12 along with associated keys illustrated at 14 and 15.

Figure 2:
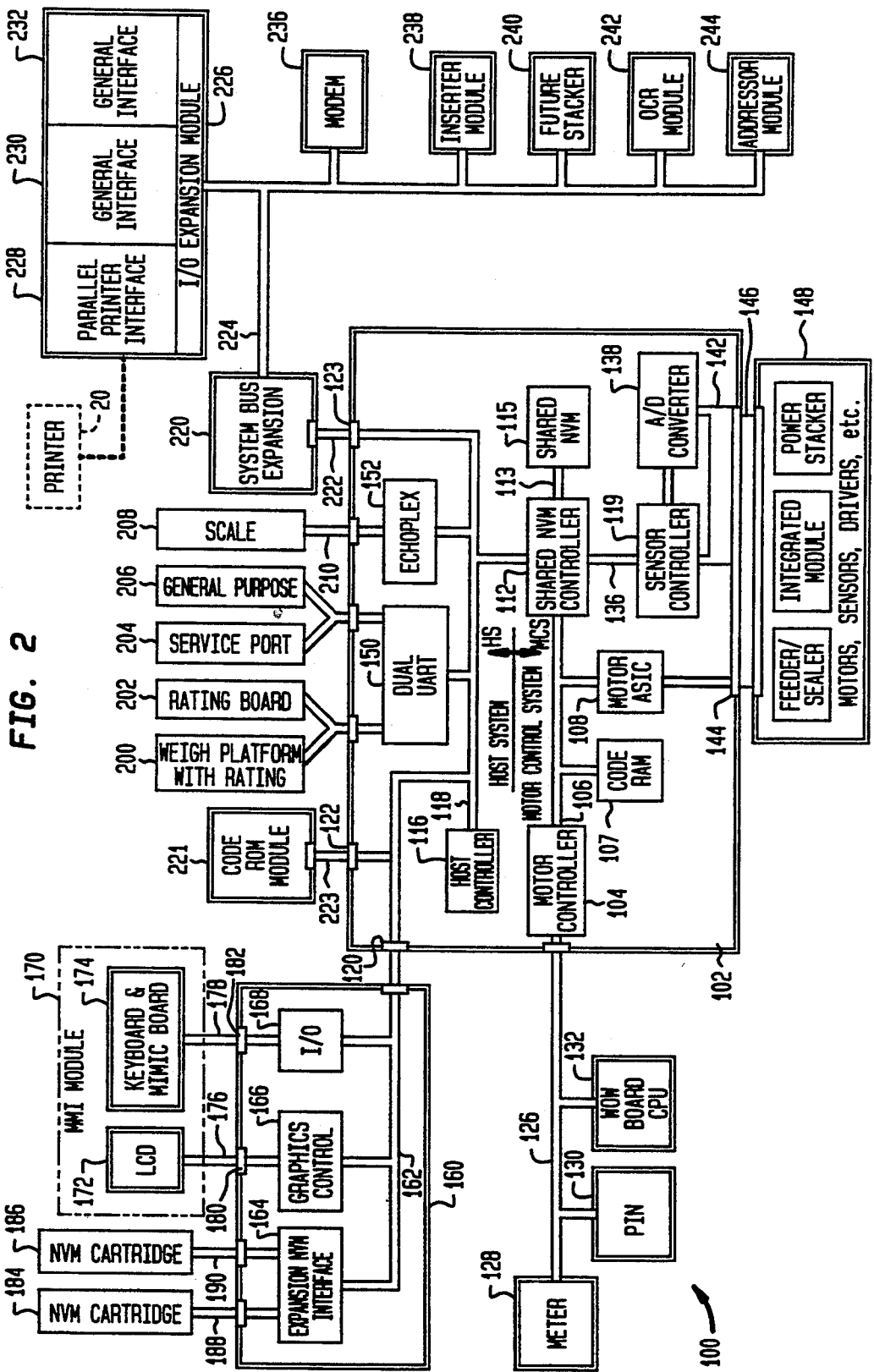
FIG. 2 is a schematic block diagram of a mailing machine microcontroller system in which the meter-activity-logging functions in accordance with the invention may be incorporated.

FIG. 2 shows a suitable microprocessor control system 100 for the mailing machine comprising, for example, a board 102 having motor controller 104 communicating via bus 106 with ROM 107, motor specific chip 108 and shared non-volatile memory (NVM) controller 112. Host controller 116 communicates via bus 118 with NVM controller 112. The NVM controller 112 communicates via bus 113 with shared NVM 115. The motor controller 104 also communicates via bus 126 with the meter through meter board 128, dater board 130 and scale board 132. Bus 118 also allows communication between the host controller 116 and DUAL UART module 150 and the Echoplex communication module 152. As previously stated, the operations of postal accounting and refilling of postal value in electronic postage meters is well known and will not be further described herein.

Microprocessor based sensor controller 119 is in bus communication with NVM controller 112 via bus 136. Sensor bus 142 enables communication from sensor controller 119 and A/D converter 138 to harness coupler 144 from which connection a suitable flex harness 146 is connected to the respective drive motors and sensors of the mailing machine 1 indicated generally at 148. A more detailed description of such a mailing machine postage meter is described in U.S. Pat. No. 4,935,078 entitled High Throughput Mailing Machine Timing.

"Personality" module 160 communicates with host controller bus 118 through bus 162 via coupler 120. This module includes Expansion NVM 164, Graphics controller 166, combination keyboard and MIMIC I/O port 168. The man-machine interface module 170 includes a liquid-crystal display board 172 as well as a keyboard and MIMIC board 174 which are in respective bus 176 and 178 communication with graphics controller 166 and I/O board 168 through respective couplers 180 and 182. It will be appreciated that other means of display, such as for example, LED or CRT displays, and data entry means such as, for example bar code readers as described in U.S. application Ser. No. 07/985,061 entitled "MAIL PROCESSING SYSTEM HAVING A BARCODE USER INTERFACE" and assigned to the assignee of the present invention. NVM accounting cartridges 184 and 186 are in communication with the NVM expansion I/O board 164 through coupled busses 188 and 190, respectively.

Dual communication module 150 permits coupling of weighing platform with rating 200, rating board 202, a service device 204 or printer 206 or other such general purpose devices. An echoplex output from a scale device 208 may be coupled to Echoplex module 152 via bus 210.

System bus controller 220 communicates via bus 222 with the host controller bus 118 by way of coupler 123. ROM module 221 is coupled by bus 223 with host controller bus 118 through coupler 122. System bus 224 enables communication of the system bus controller 220 with I/O expansion module 226 from which may be coupled, for example, parallel printer interface 228, general purpose interface 230 and custom parallel interface 232. Printer 20 may be connected to the printer interface 228. Optional devices such as, for instance, a modem 236, inserter module 238, power stacker 240 OCR module 242, addresser module 224, and an additional stacker module may be attached for communication via bus 224.

Figure 3:
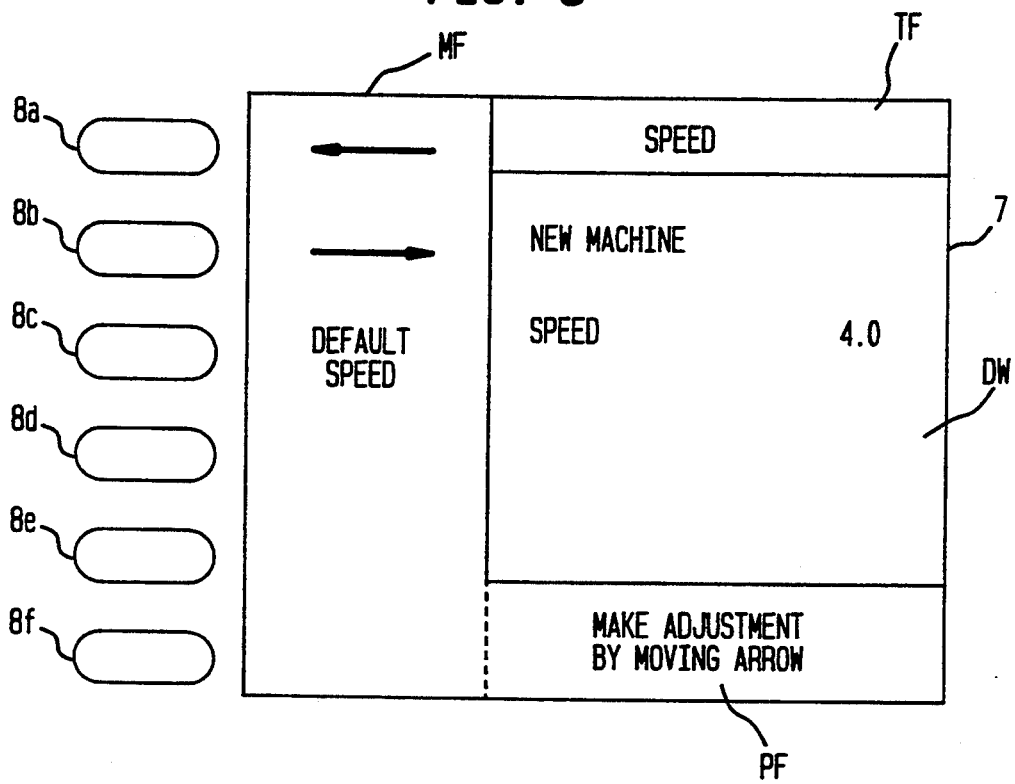
FIG. 3 is an illustration of a particular display for operator interaction with the mailing machine postage meter combination.

Referring to FIG. 3, a suitable display is indicated at 7. The illustrated display is mapped such that each screen defines data window area DW, a soft key menu field MF, a screen title field TF, and a prompt/error field PF. The soft keys shown at 8a through 8f are aligned to respective segments of the screen field MF to allow the operator to associate options presented in the segments of the field MF with the respective adjacent soft key. Operator instructions, requests for operator data input and error messages may be presented in the prompt field PF. Data window DW allows other pertinent information to be displayed. A detailed description of the operation and control of the display is available from U.S. application Ser. No. 629,796 filed Dec. 19, 1990 entitled "USER INTERFACE FOR A MAIL PROCESSING SYSTEM" now abandoned and filed as Ser. No. 08/210,651 assigned to the assignee of the present application.

As detailed therein, the operator may select various options as presented on the screen in the menu field MF and the data window and prompt fields to operate the mailing machine for mail processing, and to access and print various account information and totals. As brought out above, the Post Offices typically require audit information in the form of a journal or log of daily totals of postage meter operation. This in the past has been kept typically by noting and recording the information by hand, though it is also known as brought out above to automate the process for a postage meter. Also as described in U.S. Ser. No. 08/210,651 referred to above, the known mailing machine postage meter is capable of printing as desired daily totals under control of the operator. However in the preferred embodiment of the mailing machine postage meter combination illustrated herein, the postage meter may be moved from a mailing machine at one location to another. It has been discovered that for an automated accounting system in this environment, there are novel requirements for keeping track of the postal expenditures at a given location in order to match those expended from a particular meter which has been moved between the locations.

Figure 4:
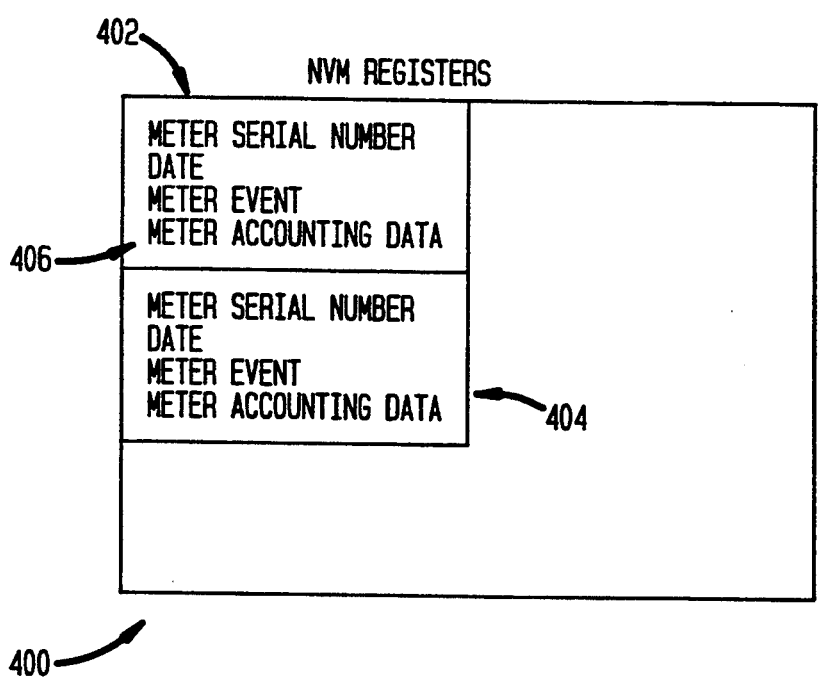
FIG. 4 is an example of a partitioning of nonvolatile memory for meter activity log store.

FIG. 4 illustrates an example at 400 of a suitable partitioning of a nonvolatile memory storage arrangement in the chosen NVM's as for example one of those illustrated in FIG. 2. Registers indicated generally at 402 are arranged as a plurality of slots 404 for storage of the meter accounting data, for example in register 406 as well as Meter Serial Number, date or timestamp and an indicator of a particular event. It will be understood that the illustration is by way of example only and other storage arrangements are also contemplated. The number of slots which may be made available is determined by the desired memory size, which of course may be expanded, as well as the desired average times between printing of the meter activity logs. The microprocessor control system of FIG. 2 operates in known manner to store and erase the information in the nonvolatile memories. The microprocessor control operating in conjunction with the programs discussed below comprise a logging apparatus for the mail processing machine.

FIG. 5 is a flow chart of the automated meter logging operation. As shown in FIG. 5, in order to assure that all events are tracked, the program checks to see whether a meter has been installed in the mailing machine 1, decision block 500, or whether meter has been removed, block 510. If the answer is "Yes" to either question, then the Update Meter Activity Log routine is called, block 520. Similarly, at decision block 530 system power-up is checked and the Update routine is called when the system is powered-up.

At block 540, the date is checked. The Post Office requirement is that there be a logging of meter values at the end of each day. Thus, in the preferred embodiment an entry of register values is made at midnight of each day. It will be appreciated that other times for date rollover may be chosen and that more entries per date may be made if desired. In any event, when the desired time is reached, the update routine, block 520 is called.

In order to provide proper accounting for the various meters which may be used in the mailing machine 1, a distinction is made between the events that occur while the meter is away from a particular mailing machine by calling those events "Off-line" while the events that take place while the meter is installed on the mailing machine are termed "On-line" events.

Thus at block 550 any off-line expenditures and at block 560 any off-line meter refills are checked and the update routine 520 called to enter the register values. Similarly, for On-line operation, the routine 520 is called for any expenditure of postage, block 570, or refill operation, block 580, or in the event that a meter discrepancy occurs such that the actual meter registers do not match the expected values in the meter activity log, block 590. It will be understood that other events may be selected used as desired for the purpose of causing an update of the meter log. If at any point along the decision path, as illustrated in FIG. 5, at blocks 500, 510, 530, 540, 550, 560, 570, 580 or 590, the decision is negative, the routing proceeds to the next decision point before proceeding to the Update Meter Activity Log routine, block 520. If the decision is negative at block 590, the system is exited.

Figure 6:
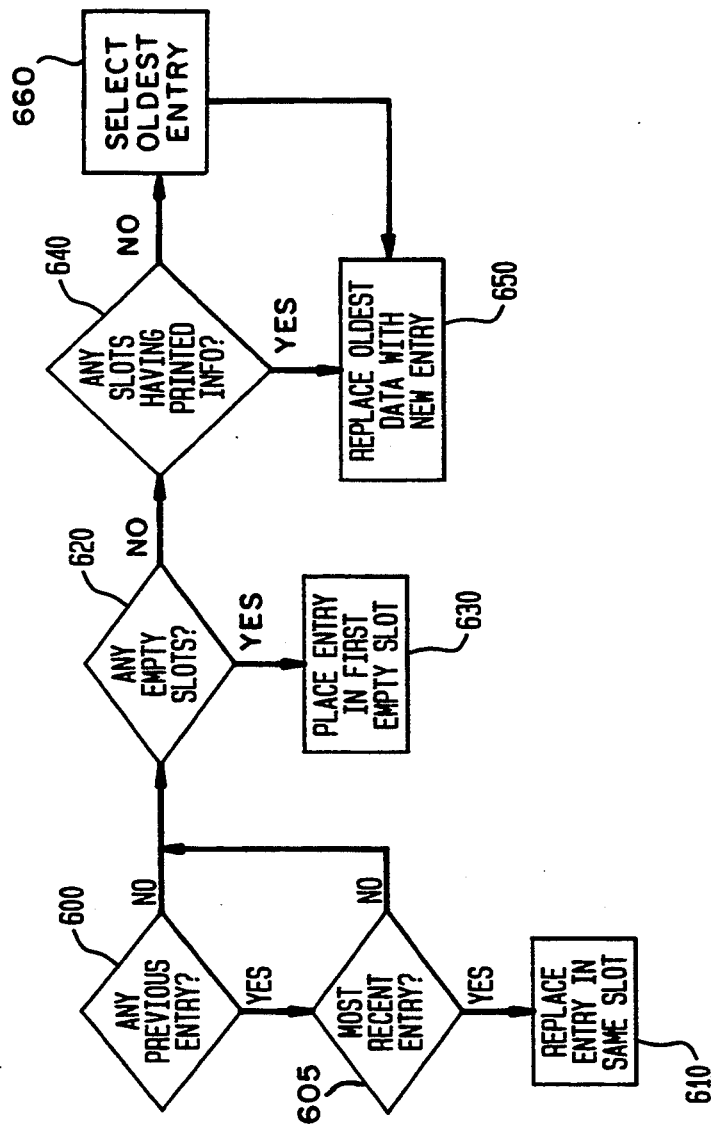
FIG. 6 is a flow chart of the updating of the Meter Activity Log.

FIG. 6 is a flow chart illustrating the Update Meter Activity Log routine, block 520. In the preferred embodiment, at block 600, the meter serial number, date, and meter event are checked to see if they match those of another entry which has been stored in known manner in registers of the Meter Activity Log partition of NVM memory as shown in FIG. 4. If there is a match and if the previous entry is the most recent entry, decision block 605, the YES branch causes the new log entry to replace the entry already present in the Log, block 610. The check at block 605 assures that meter on-line and off-line refills are not replaced with new entries until the refills have been printed as described below.

If there is no match, that is no previous entry of the same type in the Meter Activity Log, or the previous entry was not the most recent, "No" branch from block 605, then at block 620 a check is made to determine if there are any empty slots (register locations) in the Log. If there are, the new log entry is placed in the first empty slot in the Log, block 630. If there are no empty slots, a check is made, block 640, to determine whether there are any slots that have any entries that have already been printed. If there are, the new entry replaces the oldest timestamp register data which has already been printed, block 650. In the event that the meter activity log is full and there are no available slots for new entries at block 640, the oldest entry is selected at block 660 and at block 650. The new entry replaces the oldest timestamp register data even if not already printed.

It will be appreciated from the foregoing that when so constructed, the Meter Activity Log contains a history or archive of the activity taking place at a particular mailing machine in conjunction with each uniquely-identified meter that has been operated at that mailing machine. The information to be stored in the Meter Activity Log suitably includes information such as the ascending and descending register values pertaining to each unique meter by serial number and the date that postage was expended or refills occurred. Entries are added at the mailing machine whenever the meter handles postage, whenever a meter is installed or removed, and whenever discrepancies are noted so that the Meter Activity Log can be used to resolve disputes even though a number of meters are interchanged among various mailing machines. It will be appreciated that additional information can be recorded as desired.

As discussed in previously cited U.S. application Ser. No. 08/210,651, the operator can control printing of the Meter Activity Log using the keyboard-display 7 for printing in a similar manner to that discussed in conjunction with the printout of other journal information.

Figure 7:
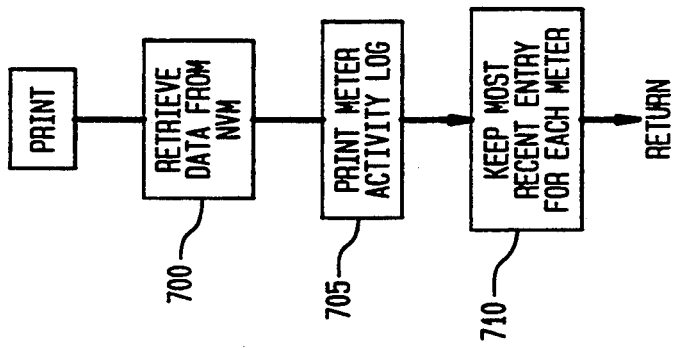
FIG. 7 is a routine for printing the Meter Activity Log.

FIG. 7 illustrates the routine for printing the Meter Activity Log. In general it comprises retrieving the data from the nonvolatile memory partition at 400, block 700, and printing the Meter Activity Log in a desired format, block 705.

After the printout is accomplished, the Meter Activity Log registers are cleared, preferably, except for the most recent entry in order to compress the number of entries to allow reuse of the registers after the printing operation, block 710. It is believed preferable that the clearing of the Meter Activity Log take place automatically, but it will be appreciated that if desired the clearing operation may be placed under operator control as well.

What is claimed is:

1. In a mail processing machine adapted to receive a plurality of postage meters, logging means for providing a meter activity log, said logging means comprising a microcomputer controller and nonvolatile memory storage means for storing meter accounting information, said meter accounting information being storable in association with a unique identification of each of a plurality of meters installed in the mail processing machine, the logging means including means for determining and storing accounting information relating to the uniquely-identified meter activity and for storing information relative to the uniquely-identified meter activity upon the occurrence of each of a plurality of selected events wherein the nonvolatile memory includes slots for storing information associated with postage meter accounting at each said selected event and said logging means further comprises means for checking whether a selected event of a same type as a current event has previously occurred and for replacing the information in a previously associated slot if the current event is the same type of event.

2. The mail processing machine of claim 1 wherein one of the selected events is the installation of each meter into the mailing machine.

3. The mail processing machine of claim 1 wherein one of the selected events is the rollover of a date to a next date.

4. The mail processing machine of claim 1 further comprising a printer operatively connected to the logging means for printing a meter activity log.

5. The mail processing system of claim 1 wherein the logging means further comprises means for clearing the registers of the nonvolatile memory, said clearing means being operative to remove all information from the registers except for a latest entry associated with each unique serial number of meter installed in the mail processing machine.

6. The mail processing machine of claim 1 wherein the means for checking checks the meter serial number, date and event to determine whether the current event is the same as a previous event.

7. The mail processing system of claim 6 wherein said logging means stores information in a new slot where there has been no previous similar event and if there are no available empty slots then in a slot containing the oldest information which has already been printed.

8. A method for logging meter activity in a mail processing machine adapted to receive a plurality of postage meters, said method comprising the steps of installing a meter in the mail processing machine, uniquely identifying said installed meter in storing accounting information relating to said meter upon installation thereof, determining and storing accounting information relating to the uniquely-identified meter activity and thereafter storing uniquely-identified meter information relative to the meter activity upon the occurrence of each of a plurality of selected events checking whether a selected event of a same type as a current event has previously occurred and thereafter replacing the information if the current event is the same type of event.

9. The method of claim 8 wherein one of the selected events is the rollover of a date to a next date.

10. The method of claim 8 further comprising the step of retrieving said stored information and printing therefrom a meter activity log.

11. The method of claim 8 wherein the checking step includes the steps of checking the meter serial number, date and event to determine whether the current event is the same as a previous event.

12. The method of claim 8 further comprising the step of storing information in a new slot where there has been no previous similar event and if there are no available empty slots then in a slot containing the oldest information which has already been printed.

13. The method of claim 8 further comprising the step of clearing the stored information, said clearing step removing all information except for a latest entry associated with each unique serial number of meter installed in the mail processing machine.

* * * * *